US012759848B2

(12) United States Patent
Zhou et al.

(10) Patent No.: US 12,759,848 B2
(45) Date of Patent: Oct. 13, 2026

(54) METHOD AND APPARATUS FOR CONTROLLING OPERATION OF BRUSHLESS WINCH MOTOR

(71) Applicant: Zhejiang Nowvow Mechanical and Electrical Corp., Ltd., Zhejiang (CN)

(72) Inventors: Jun Zhou, Zhejiang (CN); Chunxiang Zhang, Zhejiang (CN)

(73) Assignee: Zhejiang Nowvow Mechanical and Electrical Corp., Ltd., Zhejiang (CN)

( * ) Notice: Subject to any disclaimer, the term of this patent is extended or adjusted under 35 U.S.C. 154(b) by 231 days.

(21) Appl. No.: 18/888,561

(22) Filed: Sep. 18, 2024

(65) Prior Publication Data

US 2025/0376358 A1 Dec. 11, 2025

(30) Foreign Application Priority Data

Jun. 6, 2024 (CN) ......................... 202410732021.6

(51) Int. Cl.
*H02P 6/06* (2006.01)
*B66D 1/46* (2006.01)
*B66D 1/12* (2006.01)

(52) U.S. Cl.
CPC . *B66D 1/46* (2013.01); *B66D 1/12* (2013.01)

(58) Field of Classification Search
CPC .. B66D 1/46; B66D 1/12; B66D 1/485; H02P 6/06
See application file for complete search history.

(56) References Cited

U.S. PATENT DOCUMENTS 4,636,962 A * 1/1987 Broyden .................. B66D 3/20 254/362
2005/0072965 A1 4/2005 Sanders et al.
(Continued)

FOREIGN PATENT DOCUMENTS

CN 109842338 A 6/2019
CN 114389487 A 4/2022
(Continued)

OTHER PUBLICATIONS

Chen Jun et al., " Modeling and Simulation of Permanent Magnet Synchronous Motor Opimization Control System", 2013, China Academic Journal Electronic Publishing House, vol. 30, Issue 8, pp. 341-345, (English Abstract is included in the first page.).

*Primary Examiner* — Justin Holmes
(74) *Attorney, Agent, or Firm* — The PL Law Group, PLLC

(57) ABSTRACT

A method for controlling operation of a brushless winch motor includes comparing an actual first-moment operating parameter with a predicted first-moment operating parameter in first predicted operating data to obtain a first offset, outputting a first feedback parameter based on the first offset and a motor model and adjusting operation of the winch motor based on the first feedback parameter, obtaining an actual second-moment operating parameter of the adjusted winch motor, and comparing the actual second-moment operating parameter and the predicted second-moment operating parameter to obtain a second offset, correcting the operating model of the winch motor based on the second offset, outputting the predicted second-moment operating data based on the corrected operating model of the winch motor and adjusting motor operation based on a difference between the actual operating parameter of the winch motor
(Continued)

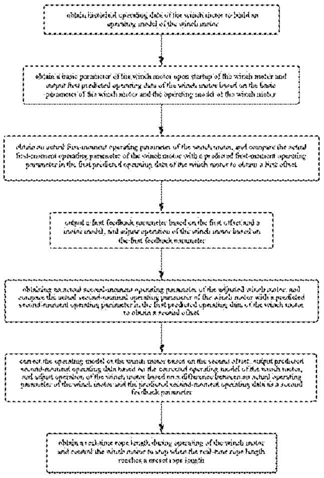

and the predicted second-moment operating data as a second feedback parameter.

10 Claims, 1 Drawing Sheet

(56) References Cited

U.S. PATENT DOCUMENTS

| | | | |
|---|---|---|---|
| 2022/0069760 | A1 | 3/2022 | Isoda et al. |
| 2024/0017969 | A1 | 1/2024 | Cormier et al. |

FOREIGN PATENT DOCUMENTS

| | | | | | |
|---|---|---|---|---|---|
| CN | 114844417 | A | | 8/2022 | |
| CN | 116111911 | A | | 5/2023 | |
| CN | 116505666 | A | | 7/2023 | |
| CN | 117186905 | A | | 12/2023 | |
| CN | 117318539 | A | * | 12/2023 | ................ H02P 6/06 |
| CN | 117682138 | A | | 3/2024 | |
| CN | 118054719 | A | | 5/2024 | |
| CN | 114357362 | B | * | 10/2024 | |
| JP | H03-194752 | A | | 8/1991 | |

* cited by examiner

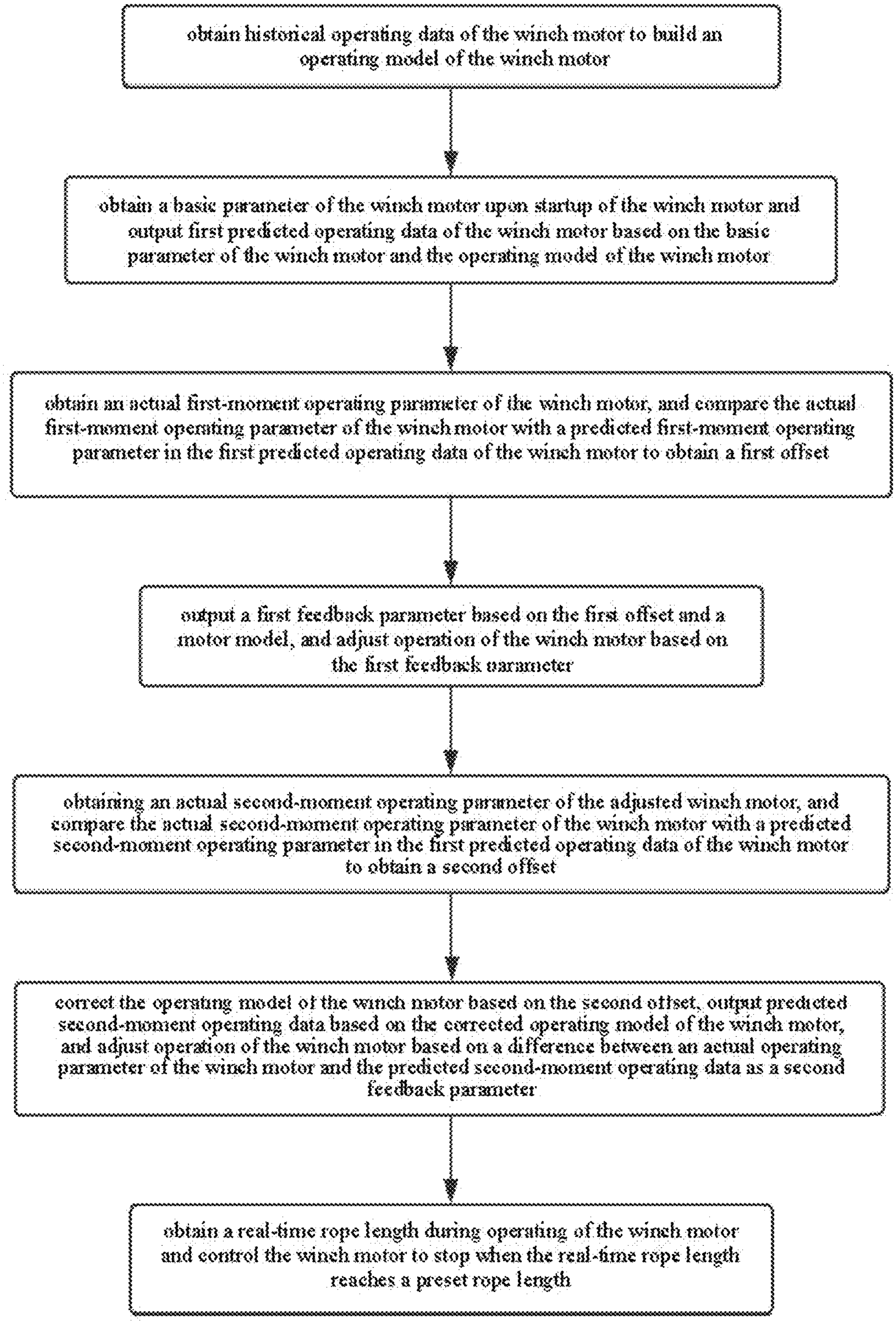
obtain historical operating data of the winch motor to build an operating model of the winch motor
obtain a basic parameter of the winch motor upon startup of the winch motor and output first predicted operating data of the winch motor based on the basic parameter of the winch motor and the operating model of the winch motor
obtain an actual first-moment operating parameter of the winch motor, and compare the actual first-moment operating parameter of the winch motor with a predicted first-moment operating parameter in the first predicted operating data of the winch motor to obtain a first offset
output a first feedback parameter based on the first offset and a motor model, and adjust operation of the winch motor based on the first feedback parameter
obtaining an actual second-moment operating parameter of the adjusted winch motor, and compare the actual second-moment operating parameter of the winch motor with a predicted second-moment operating parameter in the first predicted operating data of the winch motor to obtain a second offset
correct the operating model of the winch motor based on the second offset, output predicted second-moment operating data based on the corrected operating model of the winch motor, and adjust operation of the winch motor based on a difference between an actual operating parameter of the winch motor and the predicted second-moment operating data as a second feedback parameter
obtain a real-time rope length during operating of the winch motor and control the winch motor to stop when the real-time rope length reaches a preset rope length

METHOD AND APPARATUS FOR CONTROLLING OPERATION OF BRUSHLESS WINCH MOTOR

CROSS-REFERENCE TO RELATED APPLICATIONS AND CLAIM OF PRIORITY

This application claims the benefit under 35 USC § 119 of Chinese Patent Application Nos. 2024107320216, filed on Jun. 6, 2024, in the China Intellectual Property Office, the entire disclosure of which is incorporated herein by reference for all purposes.

BACKGROUND

1. Technical Field

The subject matter described herein relates to controlling operation of a permanent magnetic brushless DC motor for winches (hereinafter shortly referred to as "a winch motor"), and more particularly relates to a method and an apparatus for controlling operation of a brushless winch motor.

2. Background Art

A winch is a hauling or lifting device driven by a power to move an object. The winch is driven by an electric motor to create a torque, where a coupler and a drive rod drive a speed reducer to output the torque to bring a winching drum to rotate, so that the winch performs hauling or lifting by winding a rope around the winching drum. Operation of the winch may be controlled by a controller in a wired or wireless manner.

Existing winches are mainly driven by an AC asynchronous motor. When the asynchronous motor is operating, a rotor winding absorbs part of electrical energy from a power grid for magnetic excitation, which consumes electrical energy of the power grid; this part of electrical energy is partially dissipated in a form of heat as the electrical current flows in the rotor winding, the loss rate of which accounts for 20%~30% of the total motor loss, resulting in degraded motor efficiency. Some existing winches use a permanent magnet brushless motor; without induced current for magnetic excitation in the rotor of the permanent magnet motor, the stator winding likely exhibits a purely resistive load, so that the motor power factor is almost 1. When the permanent magnet synchronous motor has a duty cycle >20%, there is not much change in its working efficiency and power factor, where the working efficiency can reach as high as 80% above with low heat generation. The electric winch products adopting sensorless field-oriented control (FOC) for the permanent magnet motor offer various advantages: 1. the installation configuration of the permanent magnet brushless motor is simplified; without a Hall sensor configuration, the overall cost of the product is reduced; 2. since the Hall sensor is susceptible to various factors such as moisture, temperature, and electromagnetic interference, the sensorless approach can significantly lower the defect rate or reject rate of the products; 3. the FOC control can satisfy practical application requirements of the electric winches, such as constant current, constant power, and constant rotational speed.

In conventional technologies, it relies on experience obtained from routine operations of an electric motor to determine whether the electric motor is in an abnormal operating state; however, structural wear and environmental interference would occur over long-term use of the electric motor; in this case, deterioration of feedback control precision would affect safe operation of the winch motor.

The Chinese Patent Publication No. CN114389487A entitled "Smart Control Method for Brushless DC Motors" (published on Apr. 22, 2022) specifically discloses a method including: setting operating parameters of brushless DC motors; grouping controllers; performing start-up control and commutation control of the brushless DC motors; and performing interaction with respect to operating status data via field bus communication to thereby realize interactive control of the plurality of brushless DC motors, as well as failure detection and current protection; the patent also provides a method of preventing communication jamming and canceling ADC current pickup noise. This solution determines whether an electric motor is overloaded by detecting electrical current during operating of the electric motor and performs a corresponding operation, i.e., the solution is based on the electrical current condition during routine operation of the electric motor, which cannot perform dynamic control based on the condition of respective motors.

The Chinese Patent No. CN117186905A entitled "System for Monitoring Dry-Quenched Coke Hoist and Method for Monitoring Hoist Safety" (published on Dec. 8, 2023) specifically discloses a monitoring system, including a set of current detectors, two drum scales configured to measure a weight of a coke tank during lifting, a rail scale configured to measure a weight of a coke tank car under a hoist derrick, and key stops traversed by the hoist during operating, where the current detectors are mounted at input ends of respective hoist motor ropes and are configured to measure input currents of respective hoist motors; the drum scales are mounted underneath wire rope drums at respective sides; the rail scale is mounted directly below the hoist derrick; and the key stops are mounted in the hoist derrick and configured to detect positions where the hoist is disposed. Although this solution considers stops during movement of the motors, the stops and currents are still adjusted according to fixed values, which still cannot be dynamically adjusted dependent on motor conditions.

SUMMARY

The present application provides a method and an apparatus for controlling operation of a brushless winch motor so as to overcome a problem that in conventional technologies, control of winch motor operation is adjusted based on a fixed parameter, which cannot be consistent with an actual motor condition and thus causes instability of operating safety. The present application realizes two-way adjustment via a first offset and a second offset; firstly, the direct feedback compensation based on the offset between the operating model of the winch motor and the actual first-moment operating parameter of the winch motor mainly compensates for a model prediction-contributed error and an external interference-contributed error; then, the prediction model adjusted based on the offset between the compensated actual second-moment operating parameter of the winch motor and the predicted second-moment operating parameter in the first predicted operating data of the winch motor mainly compensates for a model mismatch-contributed error and a system dynamic variation-contributed error. The two offset adjustments complement each other to realize dynamic adjustment based on the motor condition, thereby jointly improving precision and stability of the control system.

In one aspect, there is provided a method for controlling operation of a brushless winch motor, including steps of: S1:

obtaining historical operating data of the winch motor to build an operating model of the winch motor; S2: obtaining a basic parameter of the winch motor upon startup of the winch motor and outputting first predicted operating data of the winch motor based on the basic parameter of the winch motor and the operating model of the winch motor; S3: obtaining an actual first-moment operating parameter of the winch motor, and comparing the actual first-moment operating parameter of the winch motor with a predicted first-moment operating parameter in the first predicted operating data of the winch motor to obtain a first offset; S4: outputting a first feedback parameter based on the first offset and a motor model, and adjusting operation of the winch motor based on the first feedback parameter; S5: obtaining an actual second-moment operating parameter of the adjusted winch motor, and comparing the actual second-moment operating parameter of the winch motor with a predicted second-moment operating parameter in the first predicted operating data of the winch motor to obtain a second offset; S6: correcting the operating model of the winch motor based on the second offset, outputting predicted second-moment operating data based on the corrected operating model of the winch motor, and adjusting operation of the winch motor based on a difference between an actual operating parameter of the winch motor and the predicted second-moment operating data as a second feedback parameter; and S7: obtaining a real-time rope length during operating of the winch motor and controlling the winch motor to stop when the real-time rope length reaches a preset rope length. The offset of the winch motor during actual operation of the winch motor at the first moment is corrected based on the corresponding predicted first-moment operating parameter in the first predicted operating data of the winch motor, the corrected offset being used as the first feedback parameter for compensating for current offset or voltage offset caused during FOC control of the motor; then, the second offset is obtained from comparison between the actual second-moment operating parameter of the winch motor with the first feedback parameter added and the predicted second-moment operating parameter in the first predicted operating parameter of the winch motor, which indicates that the winch motor adjusted based on the predicted operating data still has an offset that might be originated from a model mismatch-contributed error or a structural dynamic variation-contributed error; by correcting the operating model of the winch motor based on the second offset, where a potential influencing factor is added to the operating model of the winch motor, the operating model of the winch motor becomes more consistent with the current actual operating condition of the motor. By compensating for offsets due to environment factors and motor structure, operating stability of the winch motor is enhanced, which also enables adjustment of motor operation based on actual conditions, thereby enhancing operating safety of the winch motor. Meanwhile, by monitoring the rope length during operating of the winch motor, when the rope length reaches the preset rope length, it is deemed that the object hoisted reaches the destination so as to stop motor operation, which prevents overshoot or undershoot of the winch motor, further enhancing operating safety of the winch motor.

Furthermore, the step S7 further includes: obtaining a real-time operating parameter of the winch motor, calculating a reserved winch motor stop length based on the real-time operating parameter, and calculating a preset rope length based on the reserved winch motor stop length and a total rope length.

Furthermore, the step S1 further includes: obtaining the historical operating data of the winch motor, retrieving speed drop operating data in the historical operating data of the winch motor, and building an acceleration model based on the speed drop operating data.

Furthermore, the step S7 further includes: obtaining an acceleration based on the acceleration model and the basic parameter of the winch motor; and calculating the reserved winch motor stop length based on the real-time operating parameter and the acceleration.

Furthermore, the method for controlling operation of a brushless winch motor further includes: S8: obtaining real-time temperature during operating of the winch motor, and adjusting the actual operating parameter of the winch motor when the real-time temperature reaches a preset temperature.

Furthermore, the adjusting an operating parameter of the winch motor when the real-time temperature reaches a preset temperature further includes: when the real-time temperature reaches a lowest preset temperature, adjusting the operating parameter of the winch motor based on an operating parameter range between the actual operating parameter of the winch motor and a maximum operating parameter of the winch motor; and when the real-time temperature reaches a highest preset temperature, adjusting the operating parameter of the winch motor based on an operating parameter range between the actual operating parameter of the winch motor and a minimum operating parameter of the winch motor.

Furthermore, the first moment is an initial period of time when the winch motor just enters a stable operation stage, and the second moment is an initial period of time after the winch motor is adjusted based on the first feedback parameter.

Furthermore, the first offset includes offsets in a plurality of time series after the winch motor just enters the stable operation stage; and the second offset includes offsets in a plurality of time series after operating of the winch motor adjusted according to the first feedback parameter.

Furthermore, the step S2 includes: calibrating the total rope length of the winch motor before startup of the winch motor.

In another aspect, there is further provided an apparatus for controlling operation of a brushless winch motor, the apparatus being connected to the brushless winch motor and configured to implement the method as stated above, the apparatus including: a data acquisition circuit configured to acquire a real-time operating parameter of the winch motor; a data modeling circuit configured to build an operating model of the winch motor and a motor model; and a data analysis circuit configured to perform first offset feedback and second offset correction based on parameters outputted by the data acquisition circuit and the data modeling circuit and to control operation of the winch motor.

The present application offers the following benefits: firstly, the direct feedback compensation based on the offset between the operating model of the winch motor and the actual first-moment operating parameter of the winch motor mainly compensates for the model prediction-contributed error and the external interference-contributed error; then, the prediction model adjusted based on the offset between the compensated actual second-moment operating parameter of the winch motor and the predicted second-moment operating parameter in the first predicted operating data of the winch motor mainly compensates for the model mismatch-contributed error and the system dynamic variation-contributed error. The two offset adjustments complement each other to jointly improve precision and stability of the control system. By calculating the rope stop position based on dynamic movement of the motor, motor overshoot or undershoot is prevented while ensuring stability of motor stop, further enhancing operating safety of the motor. Dynamic feedback and correction based on the first offset and the second offset provide a basis for temperature control; under the condition of ensuring normal operation of the motor, appropriate upward/downward adjustment of the motor operating parameter is performed, which prevents the motor from operating at an abnormal temperature, thereby further enhancing operating safety of the motor.

BRIEF DESCRIPTION OF THE DRAWING

FIGURE is a flow diagram of a method for controlling operation of a brushless winch motor according to the present application.

DETAILED DESCRIPTION OF EMBODIMENTS

To make the objectives, technical solutions, and advantages of the disclosure more apparent, the disclosure will be described in a clear and comprehensive manner through implementations with reference to the accompanying drawings; it is apparent that the implementations described herein are only best modes of the embodiments of the disclosure, which are only intended for explaining the disclosure, not for limiting the protection scope of the disclosure. All other implementations derived by a person of normal skill in the art without exercise of inventive work fall within the protection scope of the disclosure.

FIGURE illustrates a method for controlling operation of a brushless winch motor according to a first implementation of the disclosure, including the following steps:

S1: obtaining historical operating data of the winch motor to build an operating model of the winch motor;

S2: obtaining a basic parameter of the winch motor upon startup of the winch motor and outputting first predicted operating data of the winch motor based on the basic parameter of the winch motor and the operating model of the winch motor;

S3: obtaining an actual first-moment operating parameter of the winch motor, and comparing the actual first-moment operating parameter of the winch motor with a predicted first-moment operating parameter in the first predicted operating data of the winch motor to obtain a first offset;

S4: outputting a first feedback parameter based on the first offset and a motor model, and adjusting operation of the winch motor based on the first feedback parameter;

S5: obtaining an actual second-moment operating parameter of the adjusted winch motor, and comparing the actual second-moment operating parameter of the winch motor with a predicted second-moment operating parameter in the first predicted operating data of the winch motor to obtain a second offset;

S6: correcting the operating model of the winch motor based on the second offset, outputting predicted second-moment operating data based on the corrected operating model of the winch motor, and adjusting operation of the winch motor based on a difference between an actual operating parameter of the winch motor and the predicted second-moment operating data as a second feedback parameter; and S7: obtaining a real-time rope length during operating of the winch motor and controlling the winch motor to stop when the real-time rope length reaches a preset rope length.

In this implementation, the offset of the winch motor during actual operation of the winch motor at the first moment is corrected based on the corresponding predicted first-moment operating parameter in the first predicted operating data of the winch motor, the corrected offset being used as the first feedback parameter for compensating for current offset or voltage offset caused during FOC control of the motor; then, the second offset is obtained from comparison between the actual second-moment operating parameter of the winch motor with the first feedback parameter added and the predicted second-moment operating parameter in the first predicted operating parameter of the winch motor, which indicates that the winch motor adjusted based on the predicted operating data still has an offset that might be originated from a model mismatch-contributed error or a structural dynamic variation-contributed error; by correcting the operating model of the winch motor based on the second offset, where a potential influencing factor is added to the operating model of the winch motor, the operating model of the winch motor becomes more consistent with the current actual operating condition of the motor. By compensating for offsets due to environment factors and motor structure, operating stability of the winch motor is enhanced, which can adjust motor operation based on actual conditions, thereby enhancing operating safety of the winch motor. Meanwhile, by monitoring the rope length during operating of the winch motor, when the rope length reaches the preset rope length, it is deemed that the object hoisted reaches the destination so as to stop motor operation, which prevents overshoot or undershoot of the winch motor, further enhancing operating safety of the winch motor.

Specifically, the historical operating data of the winch motor at least include historical rotational speed data, historical environment data, historical electrical parameter data, winch motor basic parameter, and historical load data; the operating model of the winch motor is built using a neural network model based on rotational speed and electrical parameter variations of the normally operating winch motor under environment influence, load influence, and basic parameter influence.

The basic parameter of the winch motor at least includes resistance, inductance, flux linkage, and environment parameter of the winch motor. The environment parameter at least includes temperature and humidity. The basic parameter of the winch motor is obtained upon startup of the winch motor. The parameters such as the resistance, inductance and flux linkage of the winch motor may be obtained based on the type of the winch motor; and the environment parameter may be obtained via a temperature sensor and a humidity sensor. The predicted data of the winch motor operating normally under the current environment is obtained based on the basic parameter of the winch motor and the operating model of the winch motor, which serves as the first predicted operating data of the winch motor.

During operating of the winch motor, the operating parameter of the winch motor is monitored in real time so as to obtain the actual first-moment operating parameter of the winch motor at the first moment; the first offset is obtained based on a difference between the actual first-moment operating parameter of the winch motor and the predicted first-moment operating parameter in the first predicted operating data of the winch motor, the first offset serving as a feedback parameter for adjusting the operating parameter of the winch motor, e.g., if the actual rotational speed is higher than the predicted rotational speed, the input voltage or current of the motor may be appropriately lowered to reduce the output power of the motor, thereby lowering the rotational speed; if the actual rotational speed is lower than the predicted rotational speed, the input voltage or current of the motor may be appropriately raised to increase the output power of the motor, thereby increasing the rotational speed. Feedback control with respect to the input voltage and current ensures that the operating state of the motor is consistent with the prediction.

For example, supposing that the predicted first-moment rotational speed in predicted operating data of a certain winch motor is 150 rpm, when the motor starts operation, the actual first-moment rotational speed detected by a velocity sensor is 155 rpm; now:

$$x_1 = |155\text{ rpm} - 150\text{ rpm}| = 5\text{ rpm};$$

where $x_1$ denotes a first offset.

Since the actual rotational speed is now higher than the predicted rotational speed, it is needed to lower the input voltage of the motor so as to reduce the output power; the decreased value of the input voltage is calculated based on the first offset according to the motor model. The motor model at least includes a voltage equation, a flux linkage equation, a torque equation, and a motion equation.

The voltage equation of the DC motor is expressed as:

$$U = E + I_a R_a$$

where U denotes the input voltage of the motor, E denotes the counter electromotive force of the motor, $I_a$ denotes the current of the motor, and $R_a$ denotes the resistance of the motor.

The voltage equation of the AC motor is expressed as:

$$U = Vt - I_a X$$

where U denotes the input voltage of the motor, Vt denotes the total voltage of the motor winding, $I_a$ denotes the current of the motor, and $X^{R_a}$ denotes the impedance of the motor.

The flux linkage equation is expressed as:

$$\phi_d = L_d I_d + \phi_f$$

$$\phi_q = L_q I_q$$

where $\phi_d$ denotes the d-axis flux linkage, $\phi_q$ denotes the q-axis flux linkage, $L_d$ denotes the d-axis inductance, $I_d$ denotes the d-axis current, $L_q$ denotes the q-axis inductance, $I_q$ denotes the q-axis inductance, and $\phi_f$ denotes the permanent magnet flux linkage.

The torque equation is expressed as:

$$T_e = Kpn[\phi_f I_q + (L_d - L_q) I_d I_q]$$

where $T_e$ denotes the electromagnetic torque of the motor, and Kpn denotes the torque constant of the motor.

The motion equation is expressed as:

$$J\frac{d\omega}{dt} = T_e - TL - B\omega$$

where J denotes the moment of inertia of the motor, ω denotes the angular speed of the motor, TL denotes the load torque, and B denotes the damping coefficient.

After performing adjustment based on the first offset feedback, the actual second-moment operating parameter of the adjusted winch motor is obtained, which is compared with the predicted second-moment operating parameter in the first predicted winch motor operating data to obtain a second offset. The first offset-based compensation is a direct feedback compensation; the offset determined based on the difference between the predicted value and the actual value can facilitate the actual output value to be closer to the predicted value to some extent. However, the model mismatch-contributed error and the system dynamic variation-contributed error cannot be compensated by the first offset, i.e., in this stage, the error is contributed by the model, not by the actual operation; therefore, the model needs to be adjusted to compensate for the error caused by discrepancy between the model and the actual system due to inaccurate parameter settings or the model structure per se. Firstly, the direct feedback compensation based on the offset between the operating model of the winch motor and the actual first-moment operating parameter of the winch motor mainly compensates for the model prediction-contributed error and the external interference-contributed error; then, the prediction model adjusted based on the offset between the compensated actual second-moment operating parameter of the winch motor and the predicted second-moment operating parameter in the first predicted operating data of the winch motor mainly compensates for the model mismatch-contributed error and the system dynamic variation-contributed error. The two offset adjustments complement each other to jointly improve precision and stability of the control system.

In this implementation, the first moment refers to the initial period of time when the winch motor just enters a stable operating stage, and the second moment refers to the initial period of time after operating of the winch motor adjusted based on the first feedback parameter. In some other implementations, the first moment may include a plurality of time series, i.e., the first offset includes offsets in a plurality of time series when the winch motor just enters the stable operating stage, and then feedback is provided after the offset is outputted in each time series; the first offset feedback-based adjustment includes feedback-based adjustments in a plurality of time series, whereby feedback precision is enhanced. Meanwhile, the second moment correspondingly includes a plurality of time series, so that the second offset includes offsets in the plurality of time series after operating of the winch motor adjusted based on the first feedback parameter; the correction is performed after the offset is outputted in each time series; the second offset-based correction adjustment includes correction adjustments in the plurality of time series, whereby correction precision is enhanced.

To prevent occurrence of overshoot or undershoot of the winch motor during operating, a real-time rope length is obtained in real time during operating of the winch motor, so that when the real-time rope length reaches a preset rope length, the winch motor is controlled to stop operation. In this case, step S7 further includes:

obtaining a real-time operating parameter of the winch motor, calculating a reserved winch motor stop length based on the real-time operating parameter, and calculating a preset rope length based on the reserved winch motor stop length and a total rope length.

The operating winch motor has a certain momentum and rotational speed. When the motor receives a stop signal with the power supply cut off, the rotor and load of the motor will continue rotating for certain time due to inertia. A motor with a larger mass and a higher rotational speed also has a larger inertia, so that the motor would continue rotation for a longer time after being shut down. To mitigate impact due to inertia, a brake or speed reducer is used to reduce the rotational speed of the rotor or the load. However, if the motor is braked too fast, the motor load would increase abruptly; the motor needs to slow down and stop rotation instantly, which increases the motor burden. Due to increase of the load, the current in the motor would also increase. Increase of the current would result in heating inside the motor, further causing over temperature of the motor. Over temperature would not only affect motor performance, but also potentially damage the insulating materials and parts inside the motor, shortening the service life of the motor. The over fast braking generates a large mechanical stress and oscillation on the motor and the mechanical parts connected thereto. The stress and oscillation might cause damages to motor parts such as the bearing and the gear, even causing failure of the overall system. During fast braking of the motor, a high pumping voltage is likely generated in the motor winding due to the counter electromotive force of the motor. This abrupt voltage rise would potentially threaten the insulating system of the motor, which would also potentially affect stability of the motor control system. Therefore, it is needed to reserve a braking distance for the motor to prevent impacts caused by fast braking of the motor.

In this implementation, the real-time operating parameter of the winch motor is obtained; now, the actual operating parameter of the winch motor at least includes the actual rotating speed and the actual electrical parameter. The actual electrical parameter includes actual current and actual voltage. The actual motor torque can be obtained based on the actual electrical parameter and the motor model. In some cases, the rotor position of the winch motor can be obtained via a sensorless observer, and then the rope winding/unwinding length is calculated based on the number of turns rotated by the rotor. In some other cases, the rope winding/unwinding length may also be directly obtained via a position detector, and a speed drop distance satisfying stable stop of the motor can be calculated based on the actual motor torque and the actual rotational speed. Considering that an even speed drop can stop motor operation more stably, an equation below is given:

$$S = \frac{v_0^2}{2a}$$

where S denotes the speed drop distance, $v_0$ denotes the actual rotational speed of the motor, and a denotes the acceleration.

In this implementation, the acceleration a may be obtained based on the rated power and load of the motor. The rated power of the motor represents the maximum power the motor can continuously output; during speed drop, the motor needs to convert part of the power to a braking force to facilitate speed drop. A motor with a higher rated power can provide a larger braking force, thereby affecting the acceleration in speed drop. For a high load or high-inertia load, the acceleration should be reduced appropriately to ensure stable stop of the motor. The speed drop operating data in historical operating data of the winch motor may be retrieved while obtaining the historical operating data of the winch motor so as to build an acceleration model based on the speed drop operating data, i.e., S1 further includes:

obtaining the historical operating data of the winch motor, retrieving speed drop operating data in the historical operating data of the winch motor, and building an acceleration model based on the speed drop operating data.

Step S7 further includes:

obtaining an acceleration based on the acceleration model and the basic parameter of the winch motor; and calculating the reserved winch motor stop length based on the real-time operating parameter and the acceleration.

In another case, in step S1, the historical operating data of the winch motor is obtained, the speed drop operating data in the historical operating data of the winch motor is retrieved, and the reserved length model is built based on the speed drop operating data; then in step S7, the basic parameter and the actual operating parameter of the winch motor are directly inputted in the reserved stop length model to output a reserved winch motor stop length. It may be understood that, under the condition of ensuring stable stop of the winch motor, a smooth speed drop manner such as S-form speed drop may also be adopted. By building this model, an acceleration variation condition consistent with the current torque and the current rotational speed is obtained as the basis for controlling speed drop of the winch motor till stop.

In this implementation, by calculating the reserved distance required from speed drop till stop of the winch motor so as to control speed drop of the motor when the difference between the rope winding/unwinding length of the winch motor and the total rope length is equal to the reserved winch motor stop length, the overshoot or undershoot of the motor is prevented while stable operation of the motor is ensured, thereby reducing the impact on the motor and the mechanical equipment.

According to a second implementation of the disclosure, step S2 further includes:

calibrating the total rope length of the winch motor before startup of the winch motor.

In this implementation, considering that the winch motor might have rope wear over long-term use, the total rope length of the winch motor is calibrated before startup of the winch motor.

Considering the temperature influence during operating of the winch motor, the method for controlling operation of a brushless winch motor further includes:

S8: obtaining real-time temperature during operating of the winch motor, and adjusting the actual operating parameter of the winch motor when the real-time temperature reaches a preset temperature.

In this implementation, the real-time temperature during operating of the winch motor is monitored; the operating parameter of the winch motor is adjusted when the real-time temperature reaches a preset temperature range. In this implementation, by converting an AD value of temperature detection to the real temperature and adjusting the operating rotational speed and the phase current of the winch motor when the temperature is beyond a preset value, normal operation of the winch motor is ensured, where the preset temperature include a lowest preset temperature and a highest preset temperature.

When the real-time temperature reaches the preset temperature, adjusting the operating parameter of the winch motor further includes:

- when the real-time temperature reaches a lowest preset temperature, adjusting the operating parameter of the winch motor based on an operating parameter range between the actual operating parameter of the winch motor and a maximum operating parameter of the winch motor; and
- when the real-time temperature reaches a highest preset temperature, adjusting the operating parameter of the winch motor based on an operating parameter range between the actual operating parameter of the winch motor and a minimum operating parameter of the winch motor.

By adjusting the corresponding operating parameter of the winch motor under different temperatures, the motor is prevented from operating under an over temperature or overcooling condition. The maximum operating parameter of the winch motor is the maximum operating parameter in the predicted operating data of the winch motor outputted by the operating model of the winch motor, and the minimum operating parameter of the winch motor is the minimum operating parameter in the predicted operating data of the winch motor outputted by the operating model of the winch motor. It may be understood that, although the present application is described in the form of sequential steps S3 through S7, steps S3, S6, and S7 are actually simultaneously performed during operating of the winch motor. Before the operating model of the winch motor is adjusted, the maximum operating parameter of the winch motor is the maximum operating parameter in the first predicted operating data of the winch motor outputted by the operating model of the winch motor, and the minimum operating parameter of the winch motor is the minimum operating parameter in the first predicted operating data of the winch motor outputted by the operating model of the winch motor; after the operating model of the winch motor is adjusted, the maximum operating parameter of the winch motor is the maximum operating parameter in the second predicted operating data of the winch motor outputted by the operating model of the winch motor, and the minimum operating parameter of the winch motor is the minimum operating parameter in the second predicted operating data of the winch motor outputted by the operating model of the winch motor.

For example, supposing that the operating parameters refer to rotational speed and phase current, when the winch motor is in an over-temperature state, i.e., when the real-time temperature reaches the highest preset temperature, the operating parameters of the winch motor are adjusted according to the equations below:

$$\text{rpm} = \text{rpm\_tag} - (\text{Temp} - t1)/(t2 - t1) * \text{rpm\_tag\_half}$$

$$\text{phse\_cur} = \text{phse\_cur\_tag} - (\text{Temp} - t1)/(t2 - t1) * \text{phse\_cur\_tag\_half},$$

where rpm denotes the operating rotational speed of the temperature-based adjusted motor, rpm_tag denotes the target rotational speed under the normal temperature, rpm_tag_half denotes half of the target rotational speed under the normal temperature, Temp denotes the real-time temperature, t1 denotes the highest preset temperature, t2 denotes the braking temperature, phse_cur denotes the temperature-based adjusted phase current, phse_cur_tag denotes the phase current under the normal temperature, and phse_cur_tag_half denotes half of the phase current under the normal temperature.

In this implementation, when the real-time temperature reaches the highest preset temperature, a first difference between the real-time temperature and the highest preset temperature is calculated, a second difference between the highest preset temperature and the braking temperature is calculated, and the operating parameters of the adjusted motor are calculated to control motor operation based on the adjustment parameters which are the ratio between the first difference and the second difference and the product of half values of the operating parameter.

In this way, when the temperature exceeds the preset value, reduction of the operating rotational speed and phase current automatically starts so as to decrease the output power of the product and reduce heating; this protects the motor from being damaged, so that the winch can still continue the operation of hauling or lifting a vehicle or object; when the temperature continues rising till the preset value, the output stops and the winch stops operating.

A third implementation of the disclosure discloses an apparatus for controlling operation of a brushless winch motor, the apparatus being connected to the winch motor, the apparatus including:

- a data acquisition circuit configured to acquire a real-time operating parameter of the winch motor;
- a data modeling circuit configured to build an operating model of the winch motor and a motor model; and
- a data analysis circuit configured to perform first offset feedback and second offset correction based on parameters outputted by the data acquisition circuit and the data modeling circuit and to control operation of the winch motor.

In this implementation, the data acquisition circuit and the data modeling circuit are communicatively connected, which are communicatively connected to the data analysis circuit, respectively.

The data acquisition circuit at least includes a temperature sensor and a position detector. The temperature sensor is configured to acquire current temperature of the winch motor, and the position detector is configured to acquire a rope winding/unwinding length. The data modeling circuit may be an STM32F4 microcontroller, and the data analysis circuit may be a master computer.

The position detector includes a magnetic field sensor and a permanent magnet; a plurality of magnetic field sensors may be provided to increase detection sensitivity and prevent detection failure due to damage of an individual sensor; and the permanent magnet has an annular notch so as to facilitate mechanical installation. The permanent magnet may be installed at the rope mounting position; when the permanent magnet travels close to the magnetic field sensor, a signal is transmitted to the controller; now, the controller stops signal output, and the calibration program calculates the current rope length, which is set to zero.

The position detector may also include a permanent magnet and a Hall sensor; when the permanent magnet moves close to the Hall sensor, the Hall signal outputs a pulse signal for position calibration.

In some other implementations, the position detector may also be a hardware touch switch or radar, configured to calibrate rope length.

To ensure braking stability of the motor, the master computer actuates an ABS braking function of the winch motor in a software manner. When the motor is controlled to stop driving, since the motor would continue rotation due to inertia, the braking force is provided by a mechanical brake. To reduce wear to the mechanical brake and increase its service life, the ABS braking function is actuated in a software manner; since kickback voltage and current would be generated when the ABS acts, within the maximum load condition allowed by the winch motor, the voltage and current are monitored by adjusting the output duty cycle. The motor energy is converted to the ABS braking force within the reliable extent of hardware, which reduces braking time and braking force, facilitates braking, and extends service life of the motor.

In the present application, a temperature monitoring mechanism is introduced to monitor motor temperature in real time; when the temperature becomes over high, the working frequency or the output torque is automatically reduced so as to protect the motor from being damaged. The operating electrical parameter of the motor is controlled based on the operating model of the winch motor; when the actual operating electrical parameter is offset from the predicted operating electrical parameter, the parameter is adjusted; for example, in a case of detecting that the current increases abnormally, the output torque is automatically reduced or the motor is automatically shut down, thereby preventing safety accidents caused by overcurrent. Meanwhile, dynamic adjustment may also be performed based on the load condition to ensure that the motor can maintain stable operation under various operating states.

The implementations described above are only exemplary implementations of the method and apparatus for controlling operation of the brushless winch motor according to the disclosure, not intended for limiting the scope of the disclosure. The scope of the disclosure is not limited to the exemplary implementations. Any equivalent variations based on the shape and configuration of the disclosure will fall within the scope of protection of the disclosure.

What is claimed is:

1. A method for controlling operation of a brushless winch motor, the method comprising:

obtaining historical operating data of the winch motor to build an operating model of the winch motor;

obtaining a basic parameter of the winch motor upon startup of the winch motor and outputting first predicted operating data of the winch motor based on the basic parameter of the winch motor and the operating model of the winch motor;

obtaining an actual first-moment operating parameter of the winch motor, and comparing the actual first-moment operating parameter of the winch motor with a predicted first-moment operating parameter in the first predicted operating data of the winch motor to obtain a first offset;

outputting a first feedback parameter based on the first offset and a motor model, and adjusting operation of the winch motor based on the first feedback parameter;

obtaining an actual second-moment operating parameter of the adjusted winch motor, and comparing the actual second-moment operating parameter of the winch motor with a predicted second-moment operating parameter in the first predicted operating data of the winch motor to obtain a second offset;

correcting the operating model of the winch motor based on the second offset, outputting predicted second-moment operating data based on the corrected operating model of the winch motor, and adjusting operation of the winch motor based on a difference between an actual operating parameter of the adjusted winch motor and the predicted second-moment operating data as a second feedback parameter; and obtaining a real-time rope length during operating of the winch motor and controlling the winch motor to stop when the real-time rope length reaches a preset rope length.

2. The method according to claim 1, wherein the obtaining the real-time rope length during operating of the winch motor and controlling the winch motor to stop when the real-time rope length reaches the preset rope length comprises:

obtaining a real-time operating parameter of the winch motor;

calculating a reserved winch motor stop length based on the real-time operating parameter; and calculating the preset rope length based on the reserved winch motor stop length and a total rope length.

3. The method according to claim 1, wherein the obtaining historical operating data of the winch motor to build an operating model of the winch motor comprises:

obtaining the historical operating data of the winch motor;

retrieving speed drop operating data in the historical operating data of the winch motor; and building an acceleration model based on the speed drop operating data.

4. The method according to claim 3, wherein the obtaining the real-time rope length during operating of the winch motor and controlling the winch motor to stop when the real-time rope length reaches the preset rope length comprises:

obtaining an acceleration based on the acceleration model and the basic parameter of the winch motor; and calculating the reserved winch motor stop length based on the real-time operating parameter and the acceleration.

5. The method according to claim 1, further comprising:

obtaining real-time temperature during operating of the winch motor; and adjusting the actual operating parameter of the winch motor when the real-time temperature reaches a preset temperature.

6. The method according to claim 5, wherein the adjusting an operating parameter of the winch motor when the real-time temperature reaches a preset temperature comprises:

when the real-time temperature reaches a lowest preset temperature, adjusting the operating parameter of the winch motor based on an operating parameter range between the actual operating parameter of the winch motor and a maximum operating parameter of the winch motor; and when the real-time temperature reaches a highest preset temperature, adjusting the operating parameter of the winch motor based on an operating parameter range between the actual operating parameter of the winch motor and a minimum operating parameter of the winch motor.

7. The method according to claim 1, wherein the first moment is an initial period of time when the winch motor just enters a stable operation stage, and the second moment is an initial period of time after the winch motor is adjusted based on the first feedback parameter.

8. The method according to claim 1, wherein the first offset comprises offsets in a plurality of time series after the winch motor just enters the stable operation stage; and the second offset comprises offsets in a plurality of time series after operating of the winch motor adjusted according to the first feedback parameter.

9. The method according to claim 1, wherein the obtaining a basic parameter of the winch motor upon startup of the winch motor and outputting first predicted operating data of the winch motor based on the basic parameter of the winch motor and the operating model of the winch motor further comprises:

calibrating the total rope length of the winch motor before startup of the winch motor.

10. An apparatus for controlling operation of a brushless winch motor, the apparatus being connected to the brushless winch motor and configured to implement the method according to claim 1, the apparatus comprising:

a data acquisition circuit configured to acquire a real-time operating parameter of the winch motor;

a data modeling circuit configured to build an operating model of the winch motor and a motor model; and a data analysis circuit configured to perform first offset feedback and second offset correction based on parameters outputted by the data acquisition circuit and the data modeling circuit and to control operation of the winch motor.

* * * * *